Aug. 23, 1932.  H. L. HARTZELL  1,873,121
TESTING APPARATUS
Filed Oct. 8, 1930  2 Sheets-Sheet 2

INVENTOR
Herman L. Hartzell
BY
Spencer, Hardman and Jehu
ATTORNEYS

Patented Aug. 23, 1932

1,873,121

UNITED STATES PATENT OFFICE

HERMAN L. HARTZELL, OF ANDERSON, INDIANA, ASSIGNOR TO DELCO-REMY CORPORATION, OF ANDERSON, INDIANA, A CORPORATION OF DELAWARE

TESTING APPARATUS

Application filed October 8, 1930. Serial No. 487,170.

This invention relates to an improved device particularly adapted to test the ignition system of an internal combustion engine.

It is among the objects of the present invention to provide a portable device adapted to test the ignition system of an internal combustion engine without necessitating the removal of any unit of said system from its normal operating position.

A further object of the present invention is to provide a portable device adapted to be connected to the various units of the engine ignition system without necessitating their removal, said device being designed accurately to perform the functions of the mechanically operated units of the system whereby operation of the engine is not required during testing of its ignition system.

Another object of the invention is to provide a portable device adapted primarily to test the ignition coil of the engine ignition system.

A still further object of the invention is to provide a portable device adapted to test the condenser unit of the engine ignition system.

Further objects and advantages of the present invention will be apparent from the following description, reference being had to the accompanying drawings wherein a preferred embodiment of one form of the present invention is clearly shown.

Various designs of testing apparatus, particularly for the purpose of testing ignition coils have been offered to the trade in recent years. Most of these were provided with hand-cranked breaker mechanism, the operation or speed of which was comparatively low and never constant. These devices also had various designs of spark gaps ranging from spark plugs to needle point gaps.

Needle point gaps are usually erratic and inaccurate. The length of gap which the spark from the coil will jump depends upon the material and the sharpness of the point and the position of other parts which would affect the electrostatic capacity of the metal in the electrodes of the gap.

Another method for testing ignition coils was by the use of a milliammeter in the secondary circuit, a method which proved quite inaccurate by test.

A still further method comprises the use of a calibrated gap in series with the spark plugs. Results obtained by this device depends as much on the spark plug gap, compression, mixture and design of the engine as it does on the coil.

It has been found by tests that the spark length necessary to fire an engine varies greatly on different designs of engines. Testing a coil on an engine which requires a long spark, the gap in series will be small as shown on the indicator and the tendency is to call it a weak coil, whereas if tested on another car which requires a lesser spark, it would indicate a good coil.

The present apparatus is designed to test the ignition coil and the condenser without removing them from the car. The spark gaps furnished in the testing device are standard gaps as provided in the testing laboratories of ignition coil builders. The motor or driving unit of the device runs at sufficiently high speed so that any weakness in the coil will be exposed.

Figure 1:
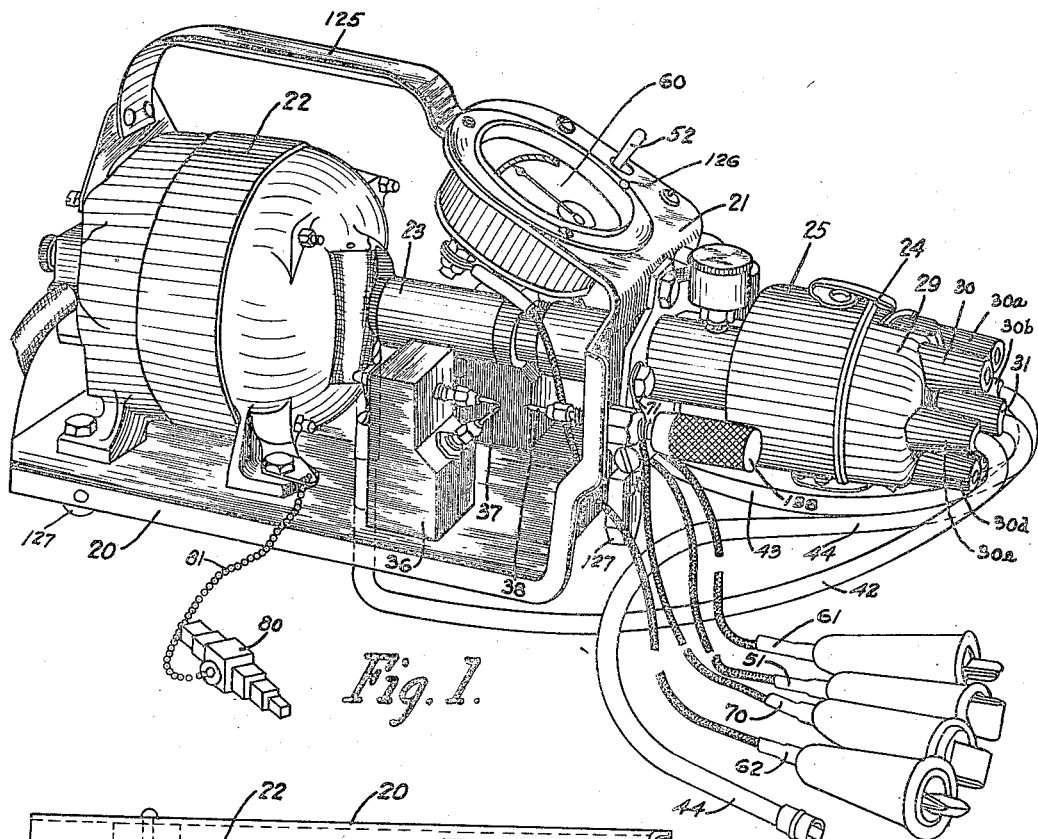
Fig. 1 is a perspective view of the portable testing device.
Figure 2:
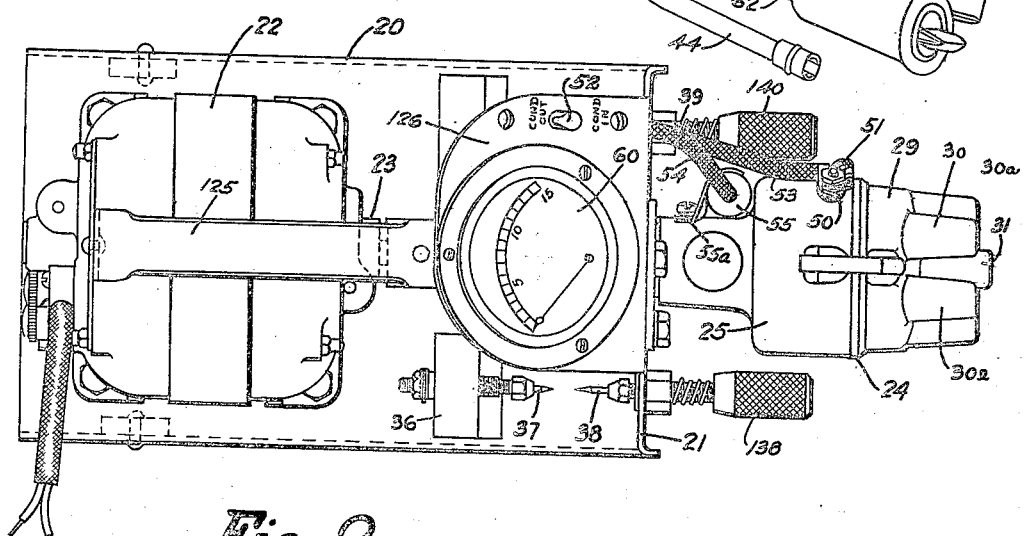
Fig. 2 is a top plan view of the device, the wire conductors leading therefrom being omitted for the sake of clearness.
Figure 4:
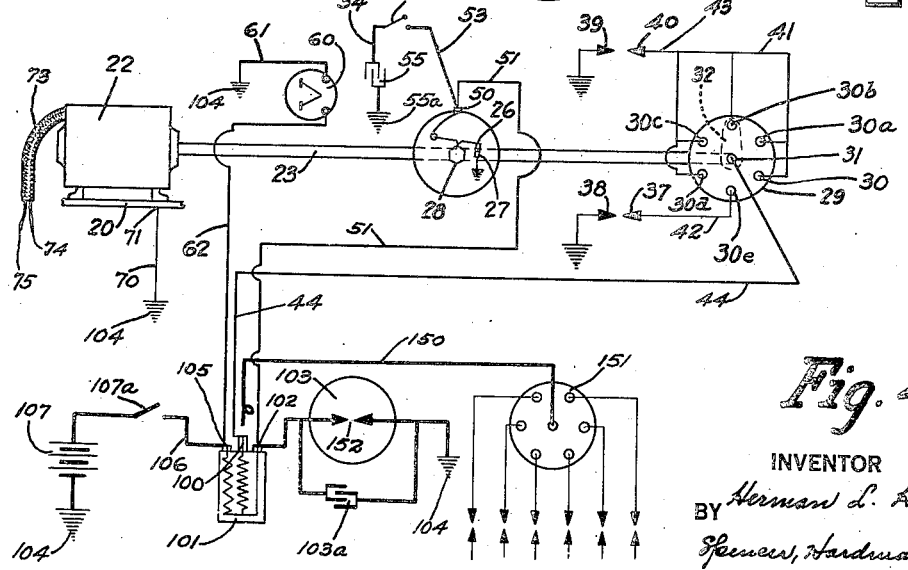
Fig. 4 is a diagrammatic view showing the ignition system of the engine and the various elements of the testing device. The conductors of the ignition system are shown in heavy lines designating permanent circuits, the conductors from the testing device, connectible with the engine ignition system for testing purposes, are shown in lighter lines to designate temporary connections.

Referring to the drawings and particularly to the Figs. 1 and 2, the device comprises a metallic frame 20 having an upturned end 21 forming a wall. Upon the platform 20 an electric motor 22 is secured, said motor having a drive shaft 23 which is journalled in a suitable bearing provided in the end wall 21. A timer distributor unit designated as a whole by the numeral 24, is supported upon the end wall 21 of the frame 20. The timer distributor unit has a housing 25 within which the circuit interrupter is contained. This circuit interrupter comprises a movable contact arm 26, a stationary contact 27 and an interrupter operating cam 28, all shown diagrammatically in the Fig. 4. The distributor portion of the unit comprises a distributor head 29 having a series of terminal sockets 30, 30a, 30b, 30c, 30d and 30e, arranged in a circular row around a central terminal socket 31. Within the distributor head 29 a distributor rotor 32 is provided shown in dotted lines in the Fig. 4. The interrupter cam 28 as well as the distributor rotor 32 is operatively connected with the motor shaft 23 so that the motor drives the cam and the rotor 28 and 32 respectively. Rotation of the cam 28 moves the movable contact arm 26 out of engagement with the stationary contact 27 while rotation of the rotor 32 will distribute sparking impulses from the terminal 31 to the various terminals 30, 30a, 30b, 30c, 30d, and 30e arranged in a circular row, as has been described.

Figure 3:
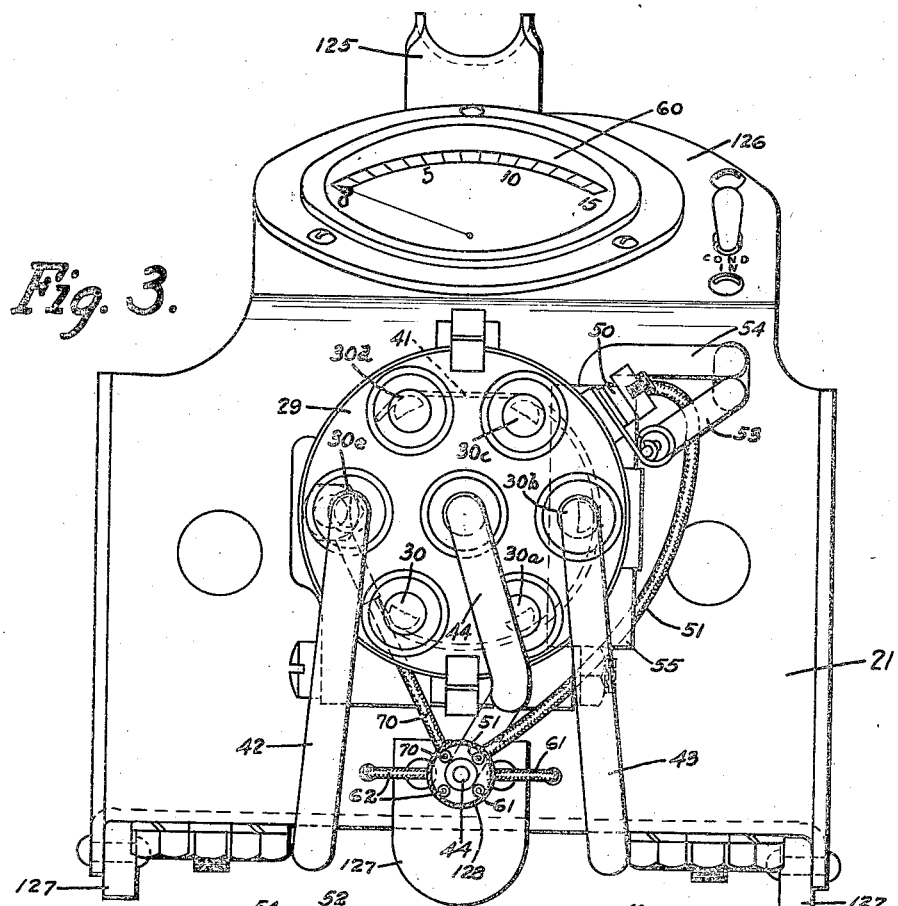
Fig. 3 is an enlarged front end view of the device.

The frame 20 has an insulating block 36 attached thereon which carries electrodes 37 forming one side of a spark gap, the other side of the spark gap comprising the electrode 38 which is adjustably carried by the end wall 21. A similar spark gap is provided by the electrode 39 carried on an insulating block similar to the block 36, the other electrode of this gap being designated by the numeral 40 and which is adjustably supported upon the end wall 21 of the frame 20. As shown in Fig. 3, the distributor has six terminals 30, 30a, 30b, 30c, 30d and 30e the first five of which are inter-connected by a wire or conductor 41 within the distributor head. The terminal 30e, or the one not connected with the five other terminals in the distributor head, is connected by wire 42 with the electrode 37 cooperating with electrodes 38 to form one spark gap. The other five terminals of the distributor head, inter-connected by the conductor 41, are connected through wire 43 to the spark gap electrode 40, cooperating with electrode 39 to form the other gap of the device. The central high tension terminal 31 of the distributor head has a wire 44 leading therefrom, this wire being adapted to be connected with the high tension terminal 100 of the ignition coil 101 which is on a car to be tested.

The timer distributor housing has a terminal 50 extending therefrom to which the movable contact arm 26 of the interrupter is electrically connected. This terminal 50 has a wire 51 leading therefrom which is connectible for testing purposes with the primary terminal 102 of the ignition coil 101, said primary terminal 102 being normally connected with one side of the interrupter 103 of the engine ignition system, the other side of said interrupter being grounded to the engine frame designated by the numeral 104.

The one side of a switch 52 is connected by wire 53 with the test timer terminal 50, the other side of said switch being connected through wire 54 with one side of a condenser 55 supported upon the timer distributor unit of the testing device, as shown in Fig. 2. The opposite side of the condenser is grounded to the timer distributor housing and through it to the frame 20 as at 55a.

A volt meter 60 is carried by an angular part of the end wall 21 of frame 20. A wire 61, connected to the one terminal of said volt meter is connectible with the frame of the vehicle for grounding purposes during coil testing. The other side of said volt meter has a wire 62 leading therefrom which is connectible to the primary terminal 105 of the ignition coil 101, said terminal 105 having the wire 106, connecting it with a battery 107. The battery is grounded to the frame of the vehicle as at 104. In order to complete the ground connections of the testing device, a wire 70 has its one end connected to the frame 20 as at 71, this wire being attachable to the frame 104 of the vehicle when the tests of the coil are to be made. A conduit 73 containing wires 74 and 75 leads from the motor 72, said wires 74 and 75 being connected with any suitable power circuit where the test is to be made. 80 designates a gauge secured to the frame by a flexible chain 81, said gauge being used properly to adjust the spark gaps for various types of engines requiring various lengths of sparks.

A handle 125 is provided by a strip of metal connected between the outer end of the motor 22 and the end wall 21 of the frame. As shown in Fig. 1, this end wall has an angular portion 126 sloping toward the motor forming a platform supporting the volt meter 60. Suitable insulating feet 127 are provided on the frame whereby the test unit may be placed upon any suitable material without danger of short circuiting. A conduit 128 contains the four wires 44, 51, 61, 62 and 70 leading from the test unit, thus substantially eliminating entanglement of these wires. In Fig. 1 this conduit has been removed in order to permit the wires to be shown in a clearer manner.

To test an ignition coil, wire 150, leading from the ignition coil terminal 100 to the distributor 151 of the ignition system on the car, is disconnected and the wire 44 is connected to said high tension terminal. The wire 62 from the volt meter is then connected to the terminal post 105 of the coil 101, or more specifically to the terminal post of said coil, connected with the battery 107. The other side of the volt meter 60 having a wire 61 extending therefrom, is connected to the frame of the vehicle designated by the numeral 104. The wire 51, leading from the terminal 50 on the test timer, is connected with the primary terminal 102 of the coil 101, which terminal is connected with the regular ignition interrupter 103 associated with the engine. The circuit interrupter 103, as designated by the numeral 152, is opened, which may be done by placing a piece of insulation between its contacts. Switch 52 of the test outfit is maintained open. Wires 74 and 75 of the motor 22 are then connected to the power circuit and the motor will operate at substantially 1725 R. P. M., turning the interrupter 28 of the test timer and the rotor 32 of the test distributor. The circuit being closed by the battery switch 107a will be interrupted in the present instance six times for every revolution of the motor shaft 23, thus six sparking impulses will be directed from the ignition coil 101 through the wire 44 to the test distributor having terminals 31, 30, 30a, 30b, 30c, 30d, and 30e. Five of these sparking impulses are directed to the terminals 30, 30a, 30b, 30c and 30d by the rotor 32 and they, being inter-connected with the conductor 41, which is connected to the electrode 40, will cause five sparks to be shot across electrodes 40 and 39. The sixth spark will be delivered to the terminal 30e of the distributor and from there to the gap provided by electrodes 37 and 38. If the coil is operating properly, the interval between the sparks at gap 37 and 38 will be constant otherwise the sparking at that point will be irregular, and of varying intensity.

If the test is made as above described and proper sparks are not obtained, then it may be that the condenser 103a, associated with the timer 103 of the engine ignition system, is faulty. To test this condenser the connection between timer 103 and terminal 102 of the coil 101 should be broken to disconnect the condenser 103a and switch 52 should be closed, thus the condenser 55, known to be in good condition, is inserted in the circuit of the primary windings of the ignition coil 101. If the sparking is improved it will signify that not the coil 101 of the ignition circuit is at fault, but its condenser 103a. If, however, the sparks are still defective, then it may be assumed that the ignition coil 101 has some defect which prevents its proper operation.

The gaps may be adjusted by screwing the knurled knobs 138 or 140 so that a proper section of the gauge 80 may be inserted between the electrodes of the respective gaps.

From the aforegoing it may be seen that applicant has provided a portable coil and condenser testing apparatus by means of which the ignition coil and condenser of the ignition system of an automobile engine may readily be tested without dismantling the system to any extent or removing any unit of the ignition system. The device is designed accurately to provide circuit interruptions whereby the ignition outfit may be tested under normal running conditions for which the engine was designed.

While the form of embodiment of the present invention as herein disclosed, constitutes a preferred form, it is to be understood that other forms might be adopted, all coming within the scope of the claims which follow.

What is claimed is as follows:

1. Apparatus for testing ignition coils of internal combustion engines comprising, in combination, a circuit interrupter; a distributor; a motor for driving said interrupter and distributor; two terminals each providing an electrode of separate spark gaps; opposing electrodes for each of the spark gaps having a common ground; means connecting the distributor to the said terminals; and means for connecting one side of the interrupter with the ignition coil to be tested and the other side of said interrupter with the engine for grounding purposes.

2. Apparatus for testing ignition coils of internal combustion engines comprising, in combination, a circuit interrupter; a distributor having a plurality of terminals; electrodes forming a spark gap; means connecting certain of the distributor terminals to a spark gap electrode; means grounding an opposed electrode of said spark gap; means for connecting other of the distributor terminals with the ignition coil; means for connecting one side of the interrupter with the ignition coil; means for connecting the other side of the interrupter with the engine for grounding purposes; and a motor for driving the interrupter and distributor.

3. Apparatus for testing ignition coils of internal combustion engines comprising, in combination, a circuit interrupter; a distributor having a plurality of terminals; a motor for driving said interrupter and distributor; means connecting certain of the distributor terminals together; electrodes forming two sets of spark gaps; means connecting the connected distributor terminals with an electrode of one spark gap; means connecting another distributor terminal to an electrode of the other spark gap; means for grounding the opposed electrodes of said gaps; means for connecting another distributor terminal with the ignition coil; means for connecting one side of the interrupter with the ignition coil; and means for connecting the other side of the interrupter with the engine for grounding purposes.

4. Apparatus for testing ignition coils of internal combustion engines comprising, in combination, a circuit interrupter; a distributor having a plurality of terminals certain of which are arranged in a circular row around a central terminal; a motor for driving said interrupter and distributor; a conductor connecting together all but one of the distributor terminals arranged in a circular row; electrodes providing two separate spark gaps; means connecting the conductor with an electrode of one spark gap; means connecting the terminal of the distributor in the circular row, and which is not connected with the conductor, with an electrode of the other spark gap; means connected with the central distributor terminal and adapted to be connected with the ignition coil; a conductor leading from one side of the interrupter and adapted to be connected with the ignition coil; another conductor leading from the other side of the interrupter and adapted to be connected to the engine for grounding purposes and means for grounding opposed electrodes of said gap.

5. A portable device for testing the ignition system of an internal combustion engine, which system includes a storage battery, an ignition coil having primary and secondary windings, and a timer distributor unit, comprising in combination, a metallic frame; an ignition unit supported upon said frame and including a circuit interrupter and a distributor; a motor on said frame operatively connected with the interrupter and distributor for driving purposes; a spark gap provided by an electrode adjustably secured to the frame so as to be in electrical connection therewith, and an electrode insulatingly carried by the frame; a conductor connecting a distributor terminal with the insulated electrode of the spark gap; a conductor leading from another distributor terminal and adapted to be connected with the secondary winding of the ignition coil; a conductor leading from one side of the interrupter and adapted to be connected to the end of the primary winding of the coil already connected to the timer of the ignition system; means for connecting the other side of the interrupter to the frame; and a conductor connected to the frame and connectible with the side of the primary winding of the coil already connected with the storage battery.

6. A portable device for testing the ignition system of an internal combustion engine, which system includes a storage battery, an ignition coil having primary and secondary windings, and a timer distributor unit, comprising in combination, a metallic frame; an ignition unit supported upon said frame and including a circuit interrupter and a distributor; a motor on said frame operatively connected with the interrupter and distributor for driving purposes; a spark gap provided by an electrode adjustably secured to the frame so as to be in electrical connection therewith and an electrode insulatingly carried by the frame; a conductor connecting a distributor terminal with the insulated electrode of the spark gap; a conductor leading from another distributor terminal and adapted to be connected with the secondary winding of the ignition coil; a conductor leading from one side of the interrupter and adapted to be connected to the end of the primary winding of the coil already connected to the timer of the ignition system; means for connecting the other side of the interrupter to the frame; and a voltmeter supported by the frame, one terminal of said meter being connected to said frame, the other having a conductor adapted to be connected to the battery side of the ignition coil.

7. A portable device for testing the ignition coil of an internal combustion engine comprising, in combination, a frame; a timer distributor unit supported by said frame; a motor mounted on the frame and operatively connected to the timer distributor unit; electrodes carried by the frame and providing spark gaps; conductors connecting certain of the distributor terminals to the respective spark gap electrodes; conductors for connecting the testing device to proper terminals of the ignition coil to be tested and means grounding the opposing electrodes of said gaps, and the motor to the engine.

8. A portable device for testing the coil and condenser of the ignition system of an internal combustion engine comprising, in combination, a timer distributor unit; a motor for driving said unit; electrodes providing two spark gaps; a condenser; a switch; conductors connecting one side of the switch with the condenser and timer unit respectively; a conductor for grounding the other side of the condenser; conductors connecting a series of timer terminals with one spark gap electrode; a conductor connecting another timer terminal with an electrode of the other spark gap; means grounding the opposing electrodes of both said spark gaps; and conductors leading from the timer distributor unit and adapted to be connected to proper terminals of the ignition coil to be tested.

9. A portable device for testing the coil and condenser of the ignition system of an internal combustion engine comprising, in combination, a timer distributor unit, a motor for driving said unit; a condenser; electrodes providing two spark gaps; means connecting certain of the distributor terminals to the spark gaps respectively; means for connecting the timer terminals and a distributor terminal to proper ignition coil terminals; a voltmeter adapted to be connected to an ignition coil terminal; a switch for controlling the condenser circuit; and means for grounding one side of the timer, condenser, spark gap and voltmeter circuits upon the engine.

10. A portable device for testing the ignition system of an internal combustion engine, which system includes a storage battery, an ignition coil having primary and secondary windings, and a timer distributor unit, comprising in combination, an ignition unit of known tested characteristics including an interrupter, a distributor and spark gap; a motor for driving the ignition unit at substantial constant predetermined speed whereby said unit will operate in reference to a standard of conditions; said distributor having one terminal connected to an indicator gap, and the remainder of said terminals having a common connection with an auxiliary gap; and means for subjecting the ignition system to be tested to the operation of the timer distributor unit of known characteristics, including a common connection from the coil of the system to each of the distributor terminals, an energy lead from the coil to be tested to the interrupter device, and means for grounding one side of the spark gaps and the interrupter.

11. A portable device for testing the coil and condenser of the ignition system of an internal combustion engine comprising in combination, a timer distributor unit, a constant speed motor for driving said unit for operating the same according to a standard of characteristics, a condenser, two sets of electrodes providing a pair of spark gaps, means connecting one of the distributor terminals to one of said gaps as an indicator, means connecting the remaining ones of said distributor terminals to the other, or auxiliary gap, means connecting the timer terminal and a common distributor terminal to the proper ignition coil terminals, means selectively connecting the condenser with said unit and means for grounding the timer, condenser and spark gaps, said test device subjecting the elements of the automotive ignition system to a selected standard of operating conditions, whereby the failure and weakness of the coil and condenser being tested may be manifest at the indicator gap.

In testimony whereof I hereto affix my signature.

HERMAN L. HARTZELL.